(12) United States Patent
Yoon et al.

(10) Patent No.: US 10,553,105 B2
(45) Date of Patent: Feb. 4, 2020

(54) REMOTE CONTROLLER AND CONTROL METHOD THEREOF

(71) Applicant: SAMSUNG ELECTRONICS CO., LTD., Suwon-si, Gyeonggi-do (KR)

(72) Inventors: Suk-hoon Yoon, Yongin-si (KR); Je-hwan Seo, Daegu (KR); Ki-hyun Song, Suwon-si (KR); Jong-keun Lee, Seoul (KR); Chae-young Lim, Bucheon-si (KR); Min-sup Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/028,792

(22) Filed: Jul. 6, 2018

(65) Prior Publication Data
US 2019/0096234 A1 Mar. 28, 2019

(30) Foreign Application Priority Data

Sep. 22, 2017 (KR) ........................ 10-2017-0122306

(51) Int. Cl.
*G08C 17/00* (2006.01)
*H04N 5/44* (2011.01)
*H04N 21/422* (2011.01)

(52) U.S. Cl.
CPC ........... *G08C 17/00* (2013.01); *H04N 5/4403* (2013.01); *H04N 21/42204* (2013.01);
(Continued)

(58) Field of Classification Search
None
See application file for complete search history.

(56) References Cited

U.S. PATENT DOCUMENTS

| 2009/0276439 | A1 | 11/2009 | Rosenblatt et al. |
| 2010/0013695 | A1 | 1/2010 | Hong et al. |

(Continued)

FOREIGN PATENT DOCUMENTS

| KR | 10-1085709 | 11/2011 |
| KR | 10-1233783 | 2/2013 |

(Continued)

OTHER PUBLICATIONS

International Search Report and Written Opinion dated Nov. 5, 2018 from International Application No. PCT/KR2018/007967, 9 pages.

*Primary Examiner* — Carlos Garcia
(74) *Attorney, Agent, or Firm* — Staas & Halsey LLP

(57) ABSTRACT

A remote controller includes a communicator and a processor configured to control the communicator to transmit an identification information request signal to a plurality of electronic apparatuses paired with the remote controller. Based on a signal that includes identification information being received from two or more of the plurality of electronic apparatuses in response to the identification information request signal, the processor controls the communicator to identify a direction of the remote controller based on a direction from which each of the signals is received. The processor causes communication to be performed via an exclusive communication channel between the remote controller and one of the plurality of electronic apparatuses based on the identified direction.

18 Claims, 12 Drawing Sheets

(52) U.S. Cl.
CPC . *H04N 21/42207* (2013.01); *H04N 21/42221* (2013.01); *H04N 21/42225* (2013.01); *G08C 2201/32* (2013.01); *G08C 2201/92* (2013.01); *H04N 2005/4407* (2013.01); *H04N 2005/4426* (2013.01)

(56) References Cited

U.S. PATENT DOCUMENTS

| | | |
|---|---|---|
| 2011/0202957 A1 | 8/2011 | Cho et al. |
| 2012/0013449 A1 | 1/2012 | Penisoara et al. |
| 2016/0366481 A1 | 12/2016 | Lim et al. |
| 2017/0162036 A1 | 6/2017 | Agardh et al. |
| 2018/0158316 A1 | 6/2018 | Ham et al. |
| 2018/0279253 A1* | 9/2018 | Knoblauch ........... H04W 64/00 |

FOREIGN PATENT DOCUMENTS

| | | |
|---|---|---|
| KR | 10-2015-0036896 | 4/2015 |
| KR | 10-1601109 | 3/2016 |
| KR | 10-1733057 | 5/2017 |
| WO | 2016/171512 | 10/2016 |

\* cited by examiner

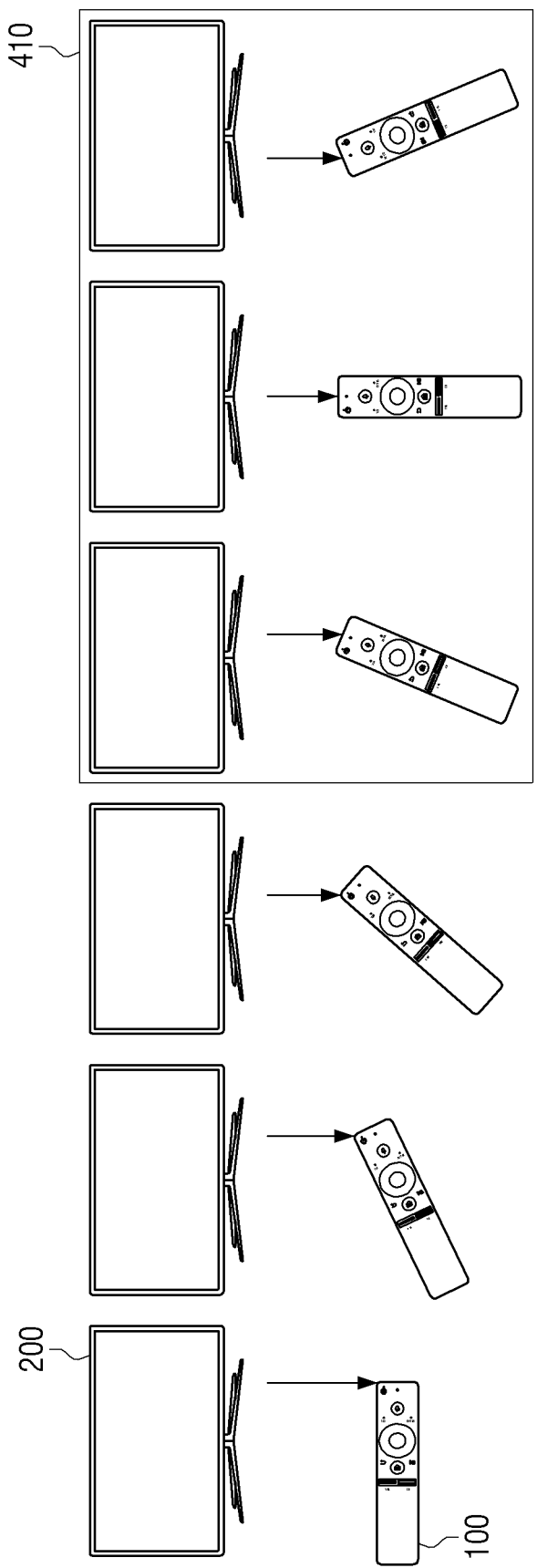

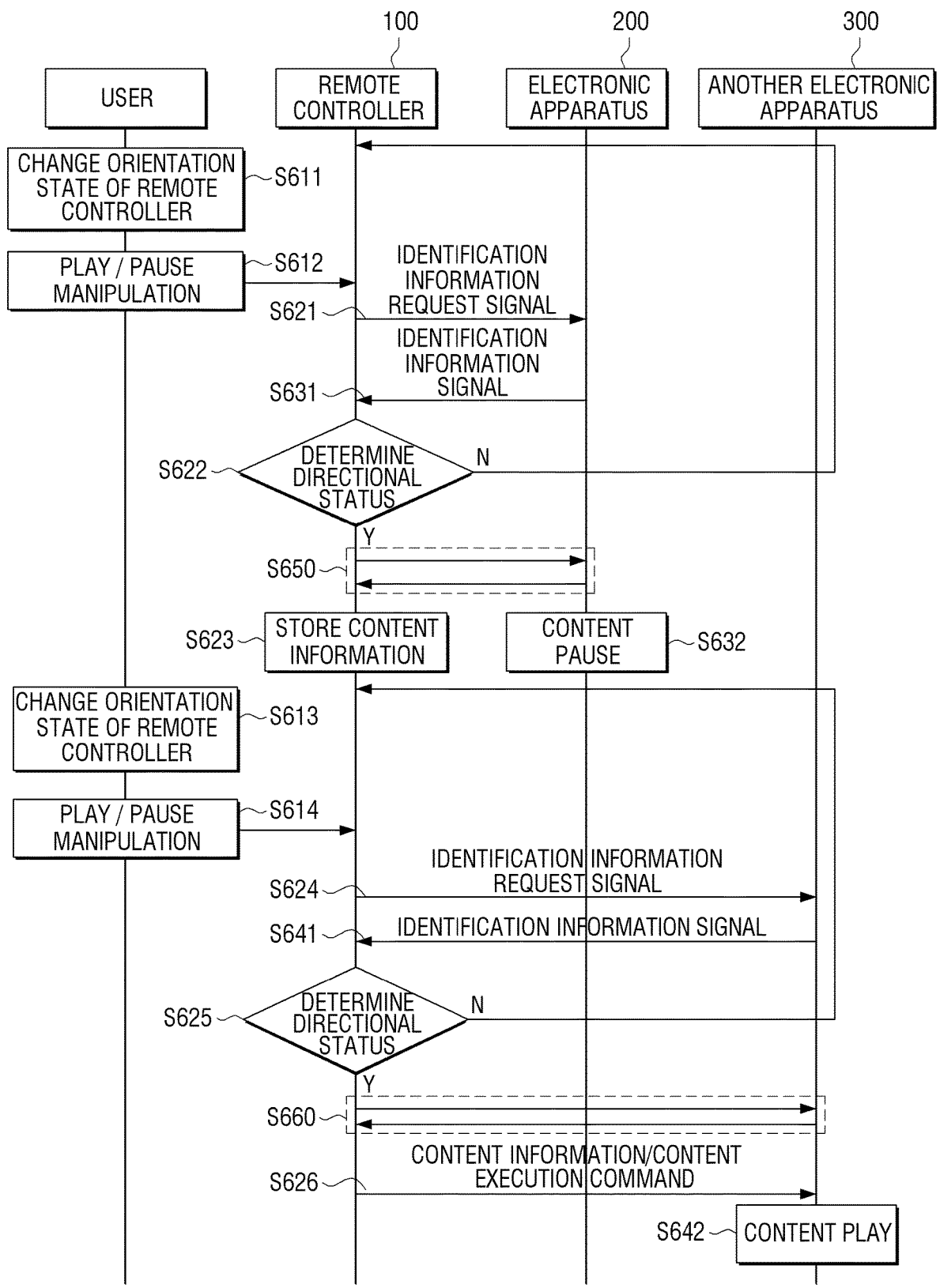

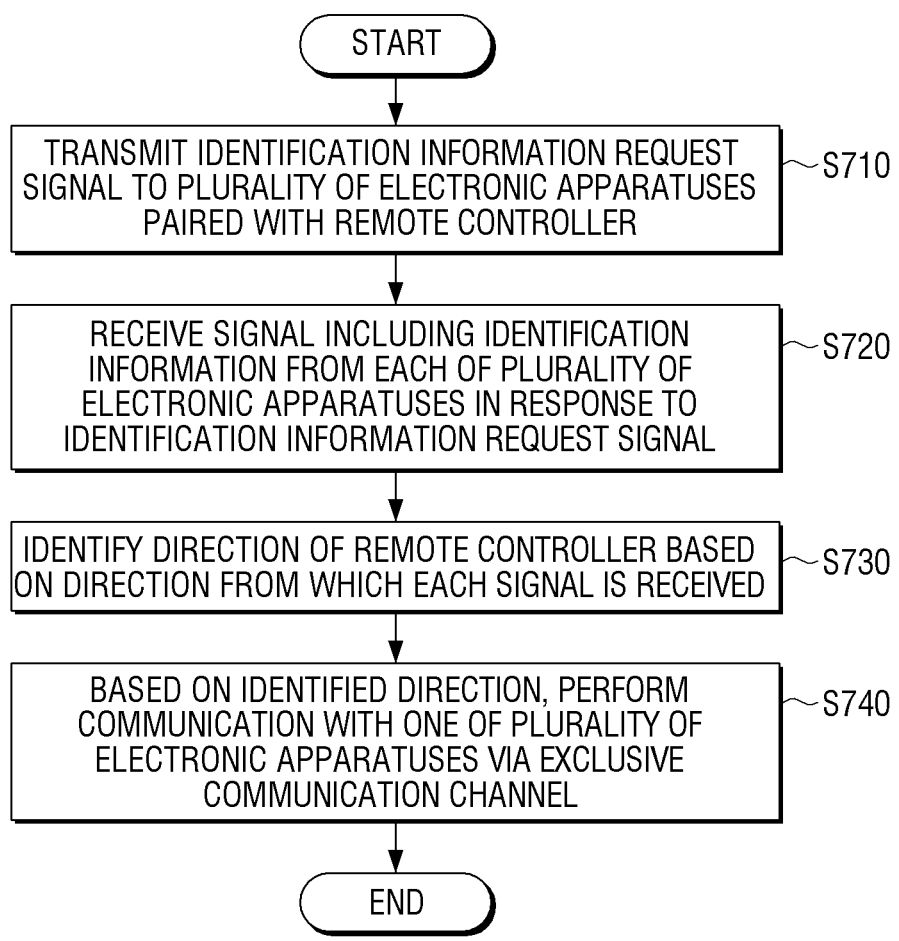

REMOTE CONTROLLER AND CONTROL METHOD THEREOF

CROSS-REFERENCE TO RELATED APPLICATION(S)

This application claims priority from Korean Patent Application No. 10-2017-0122306, filed on Sep. 22, 2017 in the Korean Intellectual Property Office, the disclosure of which is incorporated herein by reference in its entirety.

BACKGROUND

Field

Aspects of the embodiments relate to a remote controller and a controlling method thereof, and more particularly, to a remote controller that controls one of a plurality of electronic apparatuses and a controlling method thereof.

Description of the Related Art

In a related art, an infrared (IR) remote controller and a smart controller have been mainly used for controlling electronic apparatuses in a household.

Since the IR remote controller controls electronic apparatuses in an IR communication method, there is a limitation that only a one-way communication is possible. In addition, there is a problem that if there are a plurality of the same TVs, even if one control command is input, all of the plurality of TVs are controlled.

Since the smart controller uses a Bluetooth method, there has been a limitation in a controlled object such as the case in which a pairing is not pre-performed, or electronic apparatuses that do not support Bluetooth. In addition, the smart controller may control only one electronic apparatus at a moment, and in order to control another electronic apparatus, a communication channel is required to be re-set.

That is, there is a problem that it is difficult for the IR remote controller to control a specific electronic apparatus among a plurality of electronic apparatuses, and that the smart controller may control only one electronic apparatus via Bluetooth, and for controlling a new electronic apparatus, the smart controller has to disconnect an existing electronic apparatus and connect the new electronic apparatus.

Accordingly, a method for controlling only one electronic apparatus and for resolving the re-connection problem is required to be developed.

SUMMARY

The present embodiment has been made to solve the above problem. The present embodiment is for providing a remote controller that identifies a directed electronic apparatus among the plurality of electronic apparatuses, controls only the identified electronic apparatus, and if the directed electronic apparatus is changed, automatically controls another electronic apparatus, and a controlling method thereof.

According to an embodiment, there is provided a communicator, a processor configured to control the communicator to transmit an identification information request signal to a plurality of electronic apparatuses paired with the remote controller, and based on a signal that includes identification information being received from each of the plurality of electronic apparatuses in response to the identification information request signal, control the communicator to identify a direction of the remote controller based on a direction from which each of the signal is received, and to perform communication via an exclusive communication channel with one of the plurality of electronic apparatuses based on the identified direction.

The remote controller further includes a first antenna and a second antenna which are formed parallel to each other, and the processor may identify an electronic apparatus to perform communication via the exclusive communication channel between a first electronic apparatus among the plurality of electronic apparatuses and a second electronic apparatus among the plurality of electronic apparatuses, based on a direction in which a first signal transmitted from the first electronic apparatus and a second signal transmitted from the second electronic apparatus are respectively received via the first antenna and a direction in which the first signal and the second signal are respectively received via the second antenna.

The processor may calculate a first angle formed by a direction in which each of the first signal and the second signal is received via the first antenna, and the first antenna, and a second angle formed by a direction in which each of the first signal and the second signal is received via the second antenna, and the second antenna, and identify an electronic apparatus of which phase of the first angle and phase of the second angle are opposite and a difference between an absolute value of the first angle and an absolute value of the second angle is within a predetermined value, from between the first electronic apparatus and the second electronic apparatus, as an electronic apparatus to perform communication via the exclusive communication channel.

The remote controller further includes an acceleration sensor, and the processor may correct the first angle and the second angle based on a slope of the remote controller sensed by the acceleration sensor, and identify an electronic apparatus to perform communication via the exclusive communication channel based on the corrected first angle and the corrected second angle.

The processor may be, based on the processor performing communication with the electronic apparatus via the exclusive communication channel, impossible to communicate with a remaining electronic apparatus from among the plurality of electronic apparatuses.

The processor may transmit the identification information request signal to the plurality of electronic apparatuses based on a predetermined control command being input.

The processor may receive content information being executed in the electronic apparatus via the exclusive communication channel, and based on a predetermined control command being input again, may lift an exclusive communication channel with the electronic apparatus and re-transmit an identification information request signal to the plurality of electronic apparatuses, and based on a signal that includes identification information being re-received from each of the plurality of electronic apparatuses in response to the identification information request signal, re-identify a direction of the remote controller based on a direction from which each of the signals is re-received, and perform communication with another electronic apparatus among the plurality of electronic apparatuses via a new exclusive communication channel based on the re-identified direction, and transmit the received content information to the other electronic apparatus via the new exclusive communication channel.

The processor, based on the predetermined control command being input again, may transmit a command for stopping an execution of a content being executed in the electronic apparatus to the electronic apparatus, and lift an exclusive communication channel with the electronic apparatus, and transmit the received content information and an execution command of the received content to the other electronic apparatus via the new exclusive communication channel.

The remote controller may further include a sensor, and the processor, based on a detection that an orientation state of the remote controller is changed as or for more than a predetermined angle via the sensor, may lift the exclusive communication channel with the electronic apparatus and transmit the identification information request signal to the plurality of electronic apparatuses.

The processor, based on a detection that a grip by a user of the remote controller and the orientation state are changed as or for more than the predetermined angle via the sensor, may lift the exclusive communication channel with the electronic apparatus and transmit the identification information request signal to the plurality of electronic apparatuses.

According to an embodiment, a controlling method of a remote controller may include transmitting an identification information request signal to a plurality of electronic apparatuses paired with the remote controller, receiving a signal including identification information from each of the plurality of electronic apparatuses in response to the identification information request signal, identifying a direction of the remote controller based on a direction from which each of the signal is received, and performing communication via an exclusive communication channel with one of the plurality of electronic apparatuses based on the identified direction.

The remote controller may include a first antenna and a second antenna which are formed parallel to each other, and the performing communication comprises identifying an electronic apparatus to perform communication via the exclusive communication channel between a first electronic apparatus among the plurality of electronic apparatuses and a second electronic apparatus among the plurality of electronic apparatuses, based on a direction in which a first signal transmitted from the first electronic apparatus and a second signal transmitted from the second electronic apparatus are respectively received via the first antenna and a direction in which the first signal and the second signal are respectively received via the second antenna.

The performing communication may include calculating a first angle formed by a direction in which each of the first signal and the second signal is received via the first antenna, and the first antenna, and a second angle formed by a direction in which each of the first signal and the second signal is received via the second antenna, and the second antenna, and identifying an electronic apparatus of which phase of the first angle and phase of the second angle are opposite and a difference between an absolute value of the first angle and an absolute value of the second angle is within a predetermined value, from between the first electronic apparatus and the second electronic apparatus, as an electronic apparatus to perform communication via the exclusive communication channel.

The controlling method may further include sensing a slope of the remote controller, and correcting the first angle and the second angle based on the sensed slope of the remote controller, and the identifying may include identifying an electronic apparatus to perform communication via the exclusive communication channel based on the corrected first angle and the corrected second angle.

The performing communication may include, based on communication being performed with the electronic apparatus via the exclusive communication channel, making it impossible to communicate with a remaining electronic apparatus from among the plurality of electronic apparatuses.

The transmitting may include transmitting the identification information request signal to the plurality of electronic apparatuses based on a predetermined control command being input.

The performing communication may include receiving content information being executed in the electronic apparatus via the exclusive communication channel, and further include based on a predetermined control command being input again, lifting an exclusive communication channel with the electronic apparatus and re-transmitting an identification information request signal to the plurality of electronic apparatuses, re-receiving a signal including identification information from each of the plurality of electronic apparatuses in response to the identification information request signal, re-identifying a direction of the remote controller based on a direction from which each of the signal is re-received, performing communication with another electronic apparatus among the plurality of electronic apparatuses via a new exclusive communication channel based on the re-identified direction, and transmitting the received content information to the other electronic apparatus via the new exclusive communication channel.

The re-transmitting may include, based on the predetermined control command being input again, transmitting a command for stopping an execution of a content being executed in the electronic apparatus to the electronic apparatus, and lifting the exclusive communication channel with the electronic apparatus, and the transmitting the content information may include transmitting the received content information and the execution command of the received content to the other electronic apparatus via the new exclusive communication channel.

The controlling method may further include sensing an orientation state of the remote controller, and the transmitting may include, based on a detection that an orientation state of the remote controller is changed as or for more than a predetermined angle, lifting the exclusive communication channel with the electronic apparatus and transmitting the identification information request signal to the plurality of electronic apparatuses.

According to an embodiment, there is provided a non-transitory computer readable medium that stores a computer command that lets the remote controller to perform an operation based on an execution by a processor of a remote controller, wherein the operation may include transmitting an identification information request signal to a plurality of electronic apparatuses paired with the remote controller, receiving a signal including identification information from each of the plurality of electronic apparatuses in response to the identification information request signal, identifying a direction of the remote controller based on a direction from which each of the signal is received, and performing communication via an exclusive communication channel with one of the plurality of electronic apparatuses based on the identified direction.

According to the above various embodiments, a remote controller may simply control a plurality of electronic apparatuses by performing communication with a directed electronic apparatus among the plurality of electronic apparatuses via an exclusive communication channel.

BRIEF DESCRIPTION OF THE DRAWINGS

FIGS. 4A and 4B are views illustrating a method for determining a directional status according to an embodiment;

FIG. 6 is a sequence diagram illustrating a method for sharing a content between electronic apparatuses according to an embodiment; and FIG. 7 is a flow chart illustrating a controlling method of a remote controller according to an embodiment.

DETAILED DESCRIPTION

Figure 1:
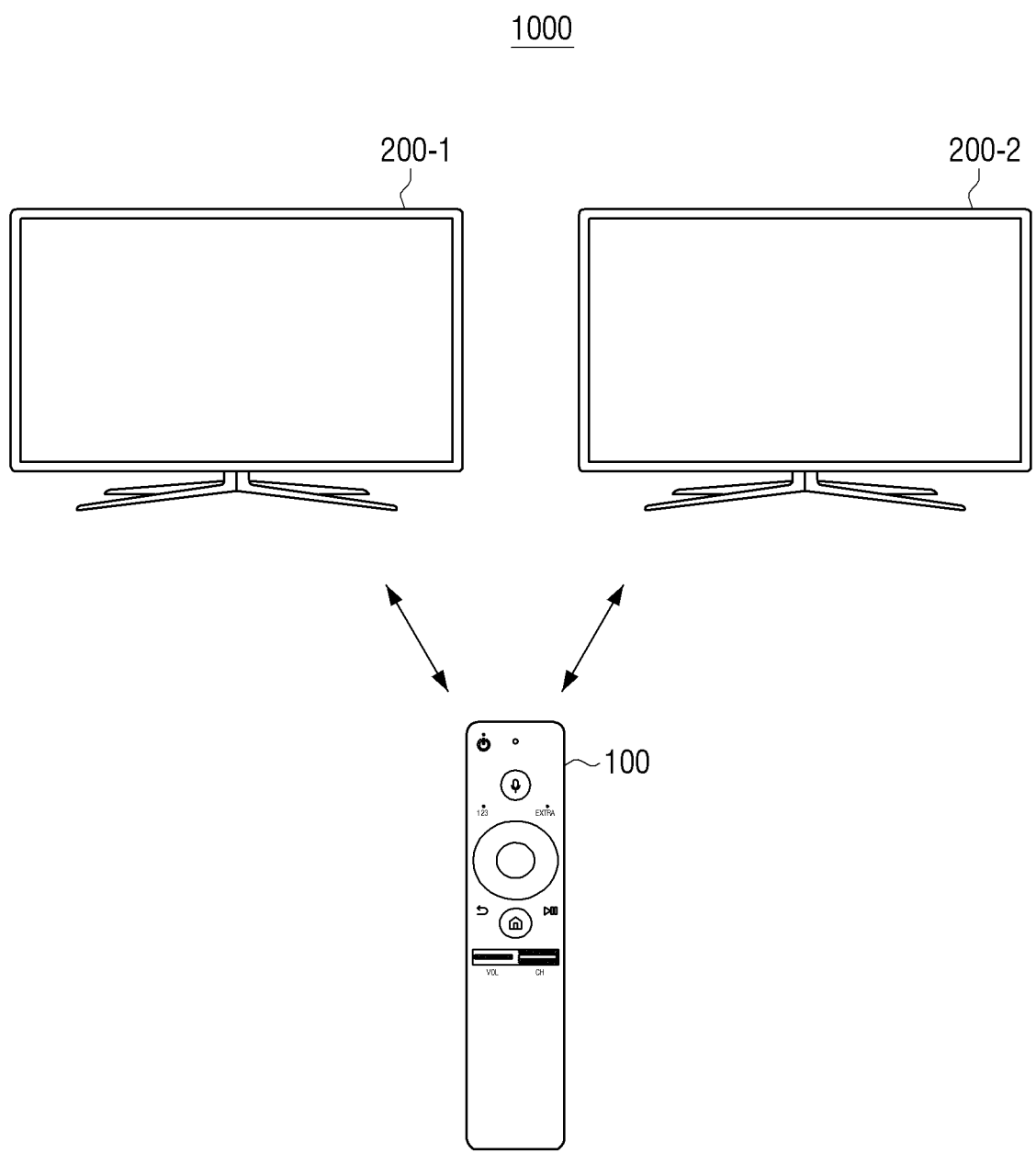
FIG. 1 is a view illustrating an electronic system according to an embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter various embodiments will be described in detail with reference to the drawings.

FIG. 1 is a view illustrating an electronic system 1000 according to an embodiment. As illustrated in FIG. 1, the electronic system 1000 includes a remote controller 100 and a plurality of electronic apparatuses 200-1 and 200-2.

The remote controller 100 may perform communication with the plurality of electronic apparatuses 200-1 and 200-2. Especially, the remote controller 100 may control the plurality of electronic apparatuses 200-1 and 200-2. For example, the remote controller 100 may be a remote controller and the like for controlling the plurality of electronic apparatuses 200-1 and 200-2. However, it is not limited thereto, and the remote controller 100 may be any apparatus which could control the plurality of electronic apparatuses 200-1 and 200-2.

The remote controller 100 may be in a paired state with the plurality of electronic apparatuses 200-1 and 200-2. For example, the remote controller 100 may be initially paired with each of the plurality of electronic apparatuses 200-1 and 200-2 in a Bluetooth standard and store basic information such as Mac Address of each of the plurality of electronic apparatuses 200-1 and 200-2.

That is, the remote controller 100 may be multi-paired with the plurality of electronic apparatuses 200-1 and 200-2. However, the remote controller 100 may not control the plurality of electronic apparatuses 200-1 and 200-2 at the same time, and may control only one of the plurality of electronic apparatuses 200-1 and 200-2. For example, the remote controller 100 may not turn on the powers of all the plurality of electronic apparatuses 200-1 and 200-2 at a specific point, but may turn on the powers of the plurality of electronic apparatuses 200-1 and 200-2 sequentially.

The remote controller 100 may transmit an identification information request signal to the plurality of electronic apparatuses 200-1 and 200-2. For example, the remote controller 100 may transmit the identification information request signal to a paired electronic apparatus by using a pre-stored MAC Address. In addition, the remote controller 100 may receive identification information from each of the plurality of electronic apparatuses 200-1 and 200-2, and control one of the plurality of electronic apparatuses 200-1 and 200-2.

Especially, the remote controller 100 may control only one electronic apparatus among the plurality of electronic apparatuses 200-1 and 200-2 based on an orientation state of the remote controller 100. The detailed description thereof will be described below.

The plurality of electronic apparatuses 200-1 and 200-2 communicate with the remote controller 100 and may be controlled by the remote controller 100. For example, the plurality of electronic apparatuses 200-1 and 200-2 may be a TV, a computer, a speaker, a monitor, a washing machine, a refrigerator, and the like. However, it is not limited thereto, and the plurality of electronic apparatuses 200-1 and 200-2 may be any apparatus which could be controlled wirelessly by the remote controller 100. In addition, FIG. 1 illustrates only two electronic apparatuses, but the number of the electronic apparatus may be less or more than two. Hereinafter it will be described that the plurality of electronic apparatuses 200-1 and 200-2 are two electronic apparatuses for convenience of explanation.

The plurality of electronic apparatuses 200-1 and 200-2 may be in a state paired with the remote controller 100. In addition, if an identification information request signal is received from the remote controller 100, the plurality of electronic apparatuses 200-1 and 200-2 may transmit identification information to the remote controller 100.

In the above, the operation of the remote controller 100 and the plurality of electronic apparatuses 200-1 and 200-2 included in the electronic system 1000 have been described briefly. Hereinafter the method that the remote controller 100 controls the plurality of electronic apparatuses 200-1 and 200-2 will be described in detail.

Figure 2A:
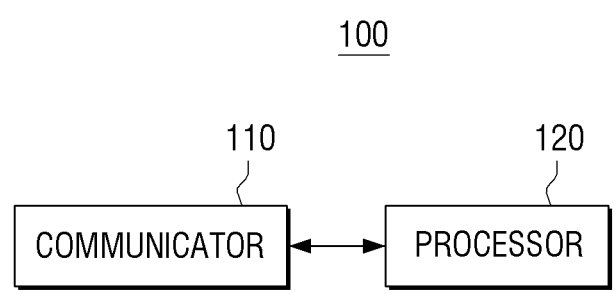
FIG. 2A is a block diagram illustrating a configuration of a remote controller according to an embodiment.

FIG. 2A is a block diagram illustrating a configuration of the remote controller 100 according to an embodiment.

According to FIG. 2A, the remote controller 100 includes a communicator 110 and a processor 120.

The communicator 110 performs communication with the plurality of electronic apparatuses 200-1 and 200-2. For example, the communicator 110 may support various communication methods such as Bluetooth (BT), Bluetooth Low Energy (BLE), Wireless Fidelity (WI-FI), Zigbee and the like. However, it is not limited thereto, and the communicator 110 may support any communication standard that could perform a directional communication among the communication standard.

Here, the directivity refers to the case in which a signal is transmitted from a specific direction with a strong energy and only a specific electronic apparatus receives the signal, and a non-directivity refers to the case in which signals are transmitted from every direction with the same energy and all electronic apparatuses receive the signals.

Alternatively, even if signals are transmitted from every direction with the same energy, only a specific electronic apparatus may recognize the signals and the other electronic apparatus may not recognize the signals, and hereinafter these signals will be described by being included in the directional signal.

In the above, it has been described that the communicator 110 is one element, but a non-directional first communicator (not illustrated) and a directional second communicator (not illustrated) may be implemented separately according to an embodiment. For example, the first communicator may use an infrared (IR) communication method, and the second communicator may use a Bluetooth Low Energy (BLE) communication method.

The processor 120 controls an operation of the remote controller 100 generally.

According to an embodiment, the processor 120 may be implemented as a digital signal processor (DSP), a microprocessor, and a Time controller (TCON). However, it is not limited thereto, and the processor 120 may include one of or more than one of a central processing unit (CPU), a Micro Controller Unit (MCU), a micro processing unit (MPU), a controller, an application processor (AP), a communication processor (CP), and an ARM processor, or may be defined as the above terms. In addition, the processor 140 may be implemented as a System on Chip (SoC) and a large scale integration (LSI) in which a processing algorithm is included, and implemented in a form of a Field Programmable gate array (FPGA).

The processor 120 may control the communicator 110 to transmit an identification information request signal to the plurality of electronic apparatuses 200-1 and 200-2 paired with the remote controller 100. For example, the processor 120 may transmit an identification information request signal sequentially via a Bluetooth communication method to the plurality of paired electronic apparatuses 200-1 and 200-2. In this case, the processor 120 may transmit a packet including each MAC Address to the plurality of electronic apparatuses 200-1 and 200-2.

However, it is not limited thereto, and the processor 120 may transmit an identification information request signal via an IR communication method to the plurality of electronic apparatuses 200-1 and 200-2 at the same time.

If the signal including the identification information is received from each of the plurality of electronic apparatuses 200-1 and 200-2 in response to the identification information request signal, the processor 120 may control the communicator 110 to identify a direction of the remote controller 120 based on the direction from which each of the signals is received, and to communicate with one of the plurality of electronic apparatuses 200-1 and 200-2 based on the identified direction via an exclusive channel.

For example, the processor 120 may communicate with an electronic apparatus nearest to the predetermined direction among the directions from which each of the signal is received to the remote controller 100, via an exclusive communication channel. Alternatively, the processor 120 may identify a location of the plurality of electronic apparatuses 200-1 and 200-2 based on the direction from which each signal is received to the remote controller 110, and may perform communication via an exclusive communication channel with the electronic apparatus located at a predetermined direction from the remote controller 100. A detailed description regarding the direction will be described below.

Here, if the processor 120 performs communication with one of the plurality of electronic apparatuses 200-1 and 200-2 via the exclusive communication channel, the processor 120 may not perform communication with the remaining electronic apparatuses of the plurality of remaining electronic apparatuses 200-1 and 200-2.

For example, if the processor 120 performs communication with one electronic apparatus via an exclusive channel, the processor 120 may transmit and receive data periodically with the one electronic apparatus. Here, the data transmitted and received periodically may be the data to confirm that communication is maintained regardless of a specific control command. If the data transmitted and received periodically is not transmitted and received any more, it may be determined that the exclusive channel is lifted.

Meanwhile, if the communication is performed with one electronic apparatus via an exclusive communication channel, the processor 120 may ignore the signal transmitted from another electronic apparatus.

Alternatively, if the processor 120 performs communication with one electronic apparatus via an exclusive communication channel, the processor 120 may change the communication method. For example, the processor 120 uses an IR communication method before performing communication with one electronic apparatus via an exclusive communication channel, but when performing communication with one electronic apparatus via an exclusive communication channel, the processor 120 may use a Wi-Fi direct communication method. In this case, the processor 120 may limit a power supplied to a hardware that supports the IR communication method, and thus, the IR signal transmitted from another electronic apparatus may be impossible to be received.

Meanwhile, the remote controller 100 may further include the first antenna and the second antenna formed parallel to each other. Here, the first antenna and the second antenna may be in a cylinder form. However, it is not limited thereto, and the first antenna and the second antenna may be in various forms.

The processor 120 may identify an electronic apparatus to perform communication via the exclusive communication channel between a first electronic apparatus among the plurality of electronic apparatuses 200-1 and 200-2 and a second electronic apparatus among the plurality of electronic apparatuses 200-1 and 200-2, based on a direction in which a first signal transmitted from the first electronic apparatus and a second signal transmitted from the second electronic apparatus are respectively received via the first antenna and a direction in which the first signal and the second signal are respectively received via the second antenna.

For example, the processor 120 may calculate a first angle formed by a direction in which each of the first signal and the second signal is received via the first antenna, and the first antenna, and a second angle formed by a direction in which each of the first signal and the second signal is received via the second antenna, and the second antenna, and identify an electronic apparatus of which phase of the first angle and phase of the second angle are opposite and of which a difference between an absolute value of the first angle and an absolute value of the second angle are within a predetermined size, between the first electronic apparatus and the second electronic apparatus, as an electronic apparatus to perform communication via the exclusive communication channel.

For example, when the first signal is input, the processor 120 calculates the first angle and the second angle regarding the first signal, determines whether the first angle and the second angle correspond to the above mentioned condition, and if they satisfy the condition, performs communication with the first electronic apparatus via an exclusive communication channel. If the first angle and the second angle regarding the first signal do not correspond to the above mentioned condition, the processor 120 may calculate the first angle and the second angle with regard to the second signal and if the first angle and the second angle regarding the second signal correspond to the above condition, the processor 120 may perform communication with the second electronic apparatus via an exclusive communication channel.

Meanwhile, the remote controller 100 further includes an acceleration sensor, and the processor 120 may correct the first angle and the second angle based on the slope of the remote controller 100 sensed via the acceleration sensor, and identify the electronic apparatus to perform communication via an exclusive communication channel based on the corrected first angle and the second angle. The feature of using the first antenna and the second antenna, and correcting the first angle and the second angle described above will be described below in detail with drawings.

If a predetermined control command is input, the processor 120 may transmit an identification information request signal to the electronic apparatuses 200-1 and 200-2.

For example, the processor 120 may not perform communication with an electronic apparatus via an exclusive communication channel before a predetermined control command is input. Alternatively, the processor 120 may maintain the exclusive communication channel with an electronic apparatus in which communication has been performed, before a predetermined control command is input.

In addition, the processor 120 may receive information on the content being executed in an electronic apparatus via the exclusive communication channel, and if a predetermined control command is input again, lift the exclusive communication channel with the electronic apparatus and re-transmit the identification information request signal to the plurality of electronic apparatuses 200-1 and 200-2, and if the signal including identification information is re-received from the plurality of electronic apparatuses 200-1 and 200-2 in response to the identification information request signal, re-identify a direction of the remote controller 100 based on the direction from which each of the signals is re-received, and perform communication with another electronic apparatus among the plurality of electronic apparatuses 200-1 and 200-2 via a new exclusive communication channel based on the re-identified direction, and transmit the received content information to the other electronic apparatus via the new exclusive communication channel.

Here, the processor 120 may perform communication with the another electronic apparatus via the new exclusive communication channel according to that an orientation state of the remote controller 100 is changed before a predetermined control command is input. If the orientation state of the remote controller 100 is not changed before the predetermined control command is input, the processor 120 may perform communication with an electronic apparatus again via an exclusive communication channel.

Here, the processor 120 may lift the exclusive communication channel with the electronic apparatus and perform communication with the electronic apparatus again via the exclusive communication channel. However, it is not limited thereto, and the processor 120 may not lift the exclusive communication channel with the electronic apparatus if an orientation state is not changed for equal to or greater than a predetermined angle while sensing the orientation state of the remote controller 100 until the predetermined control command is input again. In this case, the processor 120 may not transmit the identification information request signal to the plurality of electronic apparatuses 200-1 and 200-2 even if the predetermined control signal is input again.

If the predetermined control command is input again, the processor 120 transmits the command for stopping the execution of a content being executed in an electronic apparatus to the electronic apparatus, lifts the exclusive communication channel with the electronic apparatus, and transmits the information on the content received to another electronic apparatus and an execution command of the received content via a new exclusive communication channel.

Meanwhile, the remote controller 100 further includes a sensor, and the processor 120 may lift an exclusive communication channel with an electronic apparatus and transmit an identification information request signal to the plurality of electronic apparatuses 200-1 and 200-2 when it is sensed that an orientation state of the remote controller 100 is changed for equal to or greater than a predetermined angle via a sensor. That is, the processor 120 may perform an operation for forming a new exclusive communication channel based on the orientation state of the remote controller 100 even if a user does not input a predetermined control command.

If it is sensed that a grip of a user and an orientation state of the remote controller 100 is changed for equal to or greater than a predetermined angle via a sensor, the processor 120 may lift the exclusive communication channel with the electronic apparatus and transmit an identification information request signal to the plurality of electronic apparatuses 200-1 and 200-2. The sensor may include the sensor such as a temperature sensor and a pressure sensor for sensing the grip of a user.

Here, the orientation state may be the state in which the remote controller 100 is disposed. The processor 120 may determine the orientation state via the direction to which a predetermined side of the remote controller 100 faces.

Meanwhile, the processor 120 may determine the orientation state absolutely or relatively. For example, the processor 120 may absolutely determine the degree of an angle formed by the predetermined side of the remote controller 100 and the north of the Earth, or relatively determine how much the angle of the direction where the predetermined side faces has been changed according to the change of the orientation state of the remote controller 100.

The processor 120 may determine the orientation state of the remote controller 100 based on the direction of the signal received from a specific electronic apparatus. Alternatively, the processor 120 may sense the orientation state in real time by using an exclusive sensor.

Hereinafter the case in which the remote controller 100 performs communication with a specific electronic apparatus via an exclusive communication channel in an orientation state in which the remote controller 100 faces the specific electronic apparatus will be described as that the remote controller 100 directs the specific electronic apparatus.

Figure 2B:
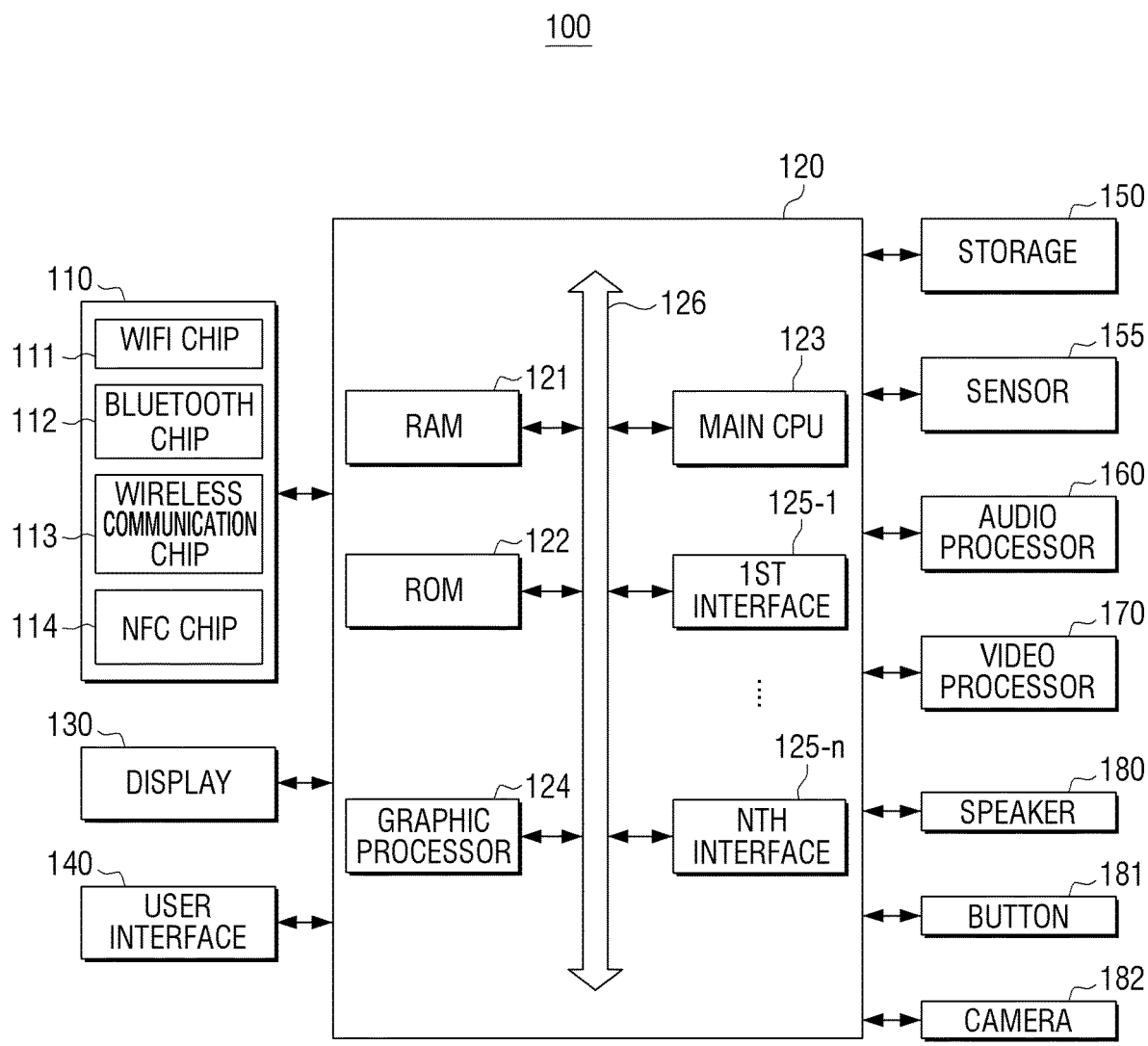
FIG. 2B is a block diagram illustrating an example of a detailed configuration of a remote controller according to an embodiment.

FIG. 2B is a block diagram illustrating an example of a detailed description of the remote controller 100. According to FIG. 2B, the remote controller 100 includes a communicator 110, a processor 120, a display 130, a user interface 140, a storage 150, a sensor 155, an audio processor 160, a video processor 170, a speaker 180, a button 181, and a camera 182. A detailed description of the elements illustrated in FIG. 2B that overlap with the elements illustrated on FIG. 2A will be omitted.

The processor 120 controls an operation of the remote controller 100 by using various programs stored in the storage 150.

Specifically, the processor 120 includes a RAM 121, a ROM 122, a main CPU 123, a graphic processor 124, a first to nth interface 125-1~125-n, and a bus 126.

The RAM 121, the ROM 122, the main CPU 123, the graphic processor 124, and the first to nth interface 125-1 to 125-n may be connected to each other via the bus 126.

The first to nth interface 125-1 to 125-n may be connected to each elements illustrated above. One of the interfaces may be a network interface which is connected to an external apparatus via a network.

The main CPU 123 may access the storage 150 and perform booting using an operating system (O/S) stored in the storage 150. In addition, the main CPU 123 performs various operations using the various programs stored in the storage 150.

The ROM 122 stores a set of instructions for system booting. When a turn-on command is input and power is supplied, the main CPU 123, according to a command stored in the ROM 122, copies O/S stored in the storage 150 to the RAM 121, and executes O/S to boot the system. If the booting is completed, the main CPU 123 copies various application programs stored in the storage 150 to the RAM 121 and executes the application programs copied to the RAM 121, thereby performing various operations.

The graphic processor 124 uses an operator (not illustrated) and a renderer (not illustrated) to generate a screen including various objects such as an icon, an image, and a text. The operator (not illustrated) operates attribute values, such as coordinate values at which each object will be represented, forms, sizes, and colors according to a layout of the screen, based on the received control instruction. The renderer (not illustrated) creates screens of various layouts including the objects based on the attribute values which are operated by the operator (not illustrated). The screen generated by the rendering unit (not shown) may be displayed in a display area of the display 130.

The operation of the above-described processor 120 may be performed by a program stored in the storage 150.

The storage 150 may store a variety of data such as an O/S software module that drives the remote controller 100, an operation module for forming an exclusive communication channel, variety of communication modules, and information regarding a plurality of paired electronic apparatuses 200-1 and 200-2.

In this case, the processor 120 may display an input image based on the information stored in the storage 150. For example, if communication is performed with one of the plurality of electronic apparatuses 200-1 and 200-2 via an exclusive communication channel, the processor 120 may display the UI for controlling an electronic apparatus. Here, the displayed UI may be stored in the storage 150 or received from the electronic apparatus.

The communicator 110 is an element to perform communication with various types of external devices according to various types of communication methods. The communicator 110 may include a Wi-Fi chip 111, a Bluetooth chip 112, a wireless communication chip 113, an NFC chip 114 and the like. The processor 120 may perform communication with various external devices by using the communicator 110.

The Wi-Fi chip 111 and the Bluetooth chip 112 perform communication in a Wi-Fi scheme and a Bluetooth scheme, respectively. In the case in which the Wi-Fi chip 111 or the Bluetooth chip 112 is used, a variety of access information such as SSID, a session key, and the like may be first transmitted and received, communication access may be performed using the variety of access information, and a variety of information may be then transmitted and received. The wireless communication chip 113 indicates a chip which performs communication in accordance with various communication standards such as IEEE, ZigBee, 3rd generation (3G), 3rd generation partnership project (3GPP), and long term evolution (LTE) or the like. The Near Field Communication (NFC) chip 114 means a chip that operates in the NFC scheme that uses a frequency band of 13.56 MHz among various RF-ID frequency bands such as 135 kHz, 13.56 MHz, 433 MHz, 860 to 960 MHz, 2.45 GHz, and the like.

Meanwhile, the communicator 110 may perform unilateral communication or bilateral communication with respect to an external apparatus. When unilateral communication is performed, the communicator 110 may receive a signal from the external apparatus. When bilateral communication is performed, the communicator 110 may receive a signal from an external apparatus and transmit a signal to an external apparatus.

The user interface 140 receives various user interactions. Herein, the user interface 140 may be implemented in various forms according to implementing exemplary embodiments of the remote controller 100. For example, the user interface 140 may be a button disposed at the remote controller 100, a microphone receiving a user voice, and a camera sensing a user motion. Further, in response to the remote controller 100 is implemented to be an electronic apparatus based on touch, the user interface 140 may be implemented to be a touch screen that forms an interlayer structure with a touch pad. In this case, the user interface 140 may be used as the above-described display 130.

The sensor 155 may include a touch sensor, a magnetic sensor, a gyro sensor, an acceleration sensor, a grip sensor, etc. The sensor 155 may sense various manipulations, such as rotation, tilt, pressure, approach, grip, etc.

The touch sensor may be realized as a capacitive sensor or a resistive sensor. The capacitive sensor calculates a touch coordinates by sensing micro-electricity excited by a user body when part of the user body touches a display screen using a dielectric coated on the display surface.

The magnetic sensor is a sensor for sensing a rotation state and a moving direction of the remote controller 100. The gyro sensor is a sensor for sensing a rotation angle of the remote controller 100. Both of the magnetic sensor and the gyro sensor may be included, but the remote controller 100 may sense a rotation state even if only one of the magnetic sensor and the gyro sensor is included.

The acceleration sensor is a sensor for sensing the degree of tilt of the remote controller 100.

The grip sensor is disposed on the rear side, border, or handle for sensing a user's grip. The grip sensor may be implemented as a pressure sensor or a temperature sensor in addition to the touch sensor.

The audio processor 160 is an element for processing audio data. The audio processor 160 may perform various types of processing, such as decoding, amplifying, noise filtering, and the like, with respect to the audio data.

The video processor 170 may process video data. The video processor 170 may perform various image processing operations such as decoding, scaling, noise filtering, frame rate conversion, and resolution conversion with respect to the video data.

The speaker 180 outputs various audio data processed by the audio processor 160 and various notification sounds or voice messages, etc.

The button 181 may include various types of buttons, such as a mechanical button, a touch pad, a wheel, etc., which are formed on the front, side, or rear of the exterior of a main body of the remote controller 100.

The camera 182 photographs a still image or a moving image according to a user's control. The camera 182 may be realized as a plurality of cameras such as front camera and back camera.

As illustrated above, the processor 120 may communicate with one of the plurality of electronic apparatuses 200-1 and 200-2 via an exclusive communication channel.

Hereinafter the operation of the remote controller 100 will be described in detail through various drawings.

Figure 3A:
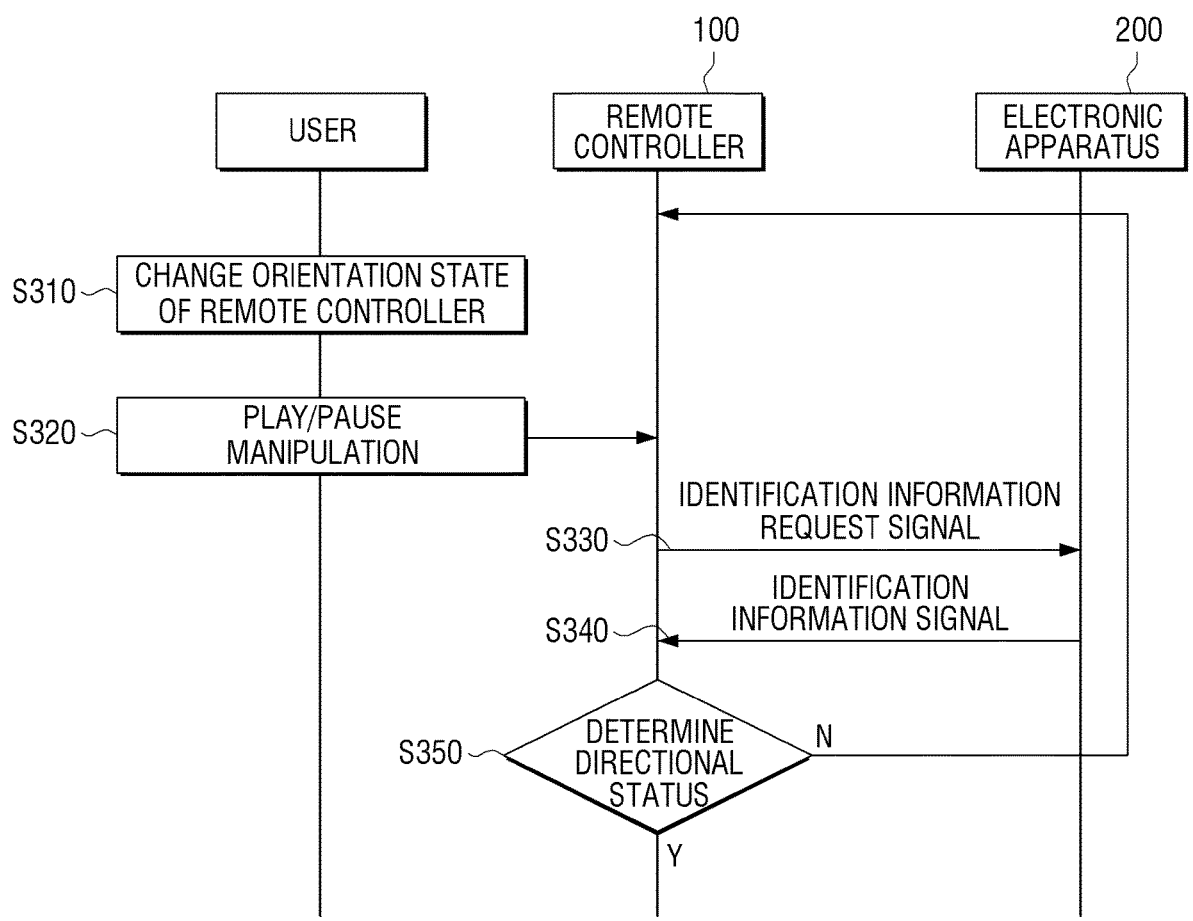
FIGS. 3A and 3B are views illustrating a method for transmitting an identification information request signal according to an embodiment.
Figure 3B:
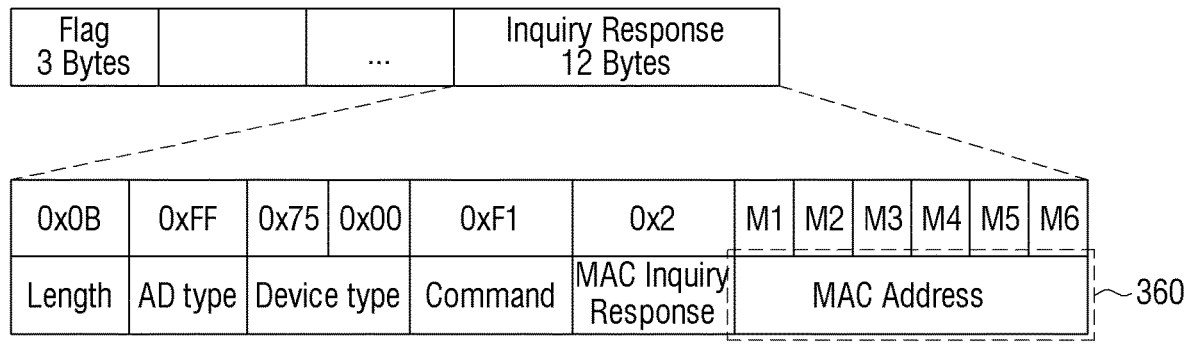

FIGS. 3A and 3B are views illustrating a method for transmitting an identification information request signal according to an embodiment.

As illustrated in FIG. 3A, a user changes an orientation state of the remote controller 100 in S310. In addition, a user manipulates Play/Pause button disposed at the remote controller 100 in S320.

The remote controller 100 transmits an identification information request signal to the electronic apparatus 200 according to a button manipulation of a user in S330. The electronic apparatus 200 transmits identification information signal to the remote controller 100 when the identification information request signal is received, in S340. The remote controller 100 may determine whether the electronic apparatus 200 is directed based on the received signal in S350.

If it is determined that the electronic apparatus 200 is directed, the remote controller 100 may communicate with the electronic apparatus 200 via an exclusive communication channel. If it is determined that the electronic apparatus 200 is not directed, the remote controller 100 may maintain the standby status or transmit an identification information request signal to another electronic apparatus.

In FIG. 3A, it is illustrated that the remote controller 100 transmits an identification information request signal to the electronic apparatus 200 according to the Play/Pause button manipulation for convenient of explanation, but the identification information request signal may be transmitted in any other conditions.

For example, the remote controller 100 may transmit the identification information request signal to the electronic apparatus 200 if an orientation state is changed as or for more than a predetermined angle. Alternatively, the remote controller 100 may transmit the identification information request signal to the electronic apparatus 200 in a predetermined time interval.

Meanwhile, in FIG. 3A, it is described that the remote controller 100 transmits the identification information request signal only to the electronic apparatus 200. However, it is merely for a convenience of explanation, and the remote controller 100 transmits the same signal to other electronic apparatuses paired with the remote controller 100 in addition to the electronic apparatus 200, and determine whether the electronic apparatuses are directed by receiving the identification information from each electronic apparatus.

Here, the identification information request signal may be a same packet as illustrated in FIG. 3B. The remote controller 100 may transmit the identification information request signal for a plurality of times by changing the MAC Address 360 in the packet of FIG. 3B.

For example, the remote controller 100 may transmit the packet that includes a MAC address corresponding to the first electronic apparatus to the first electronic apparatus and determine whether the first electronic apparatus is directed. In addition, the remote controller 100 may transmit the packet including the MAC Address corresponding to the second electronic apparatus to the second electronic apparatus and determine whether the second electronic apparatus is directed.

Meanwhile, if it is determined that any one of the plurality of electronic apparatuses is directed, the remote controller 100 may not transmit an identification information request signal with regard to remaining electronic apparatuses. For example, the remote controller 100 may be paired with five electronic apparatuses, and transmit the identification information request signal sequentially from the first electronic apparatus to the fifth electronic apparatus and determine whether the electronic apparatuses are directed. Here, if it is determined that the remote controller 100 directs the third electronic apparatus, the identification information request signal regarding the fourth and fifth electronic apparatuses may not be transmitted.

Figure 4B:
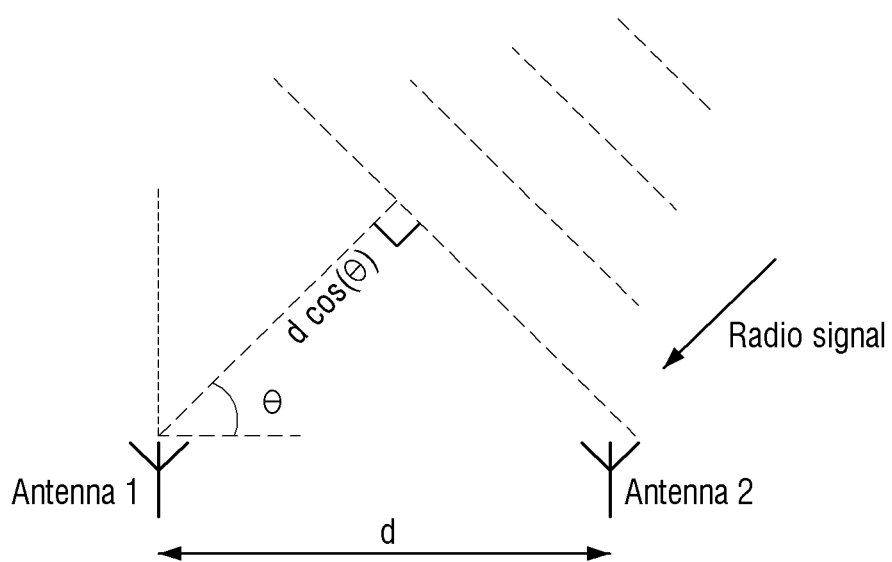

FIGS. 4A and 4B are views illustrating a directed state according to an embodiment.

As illustrated in FIG. 4A, the processor 120 may determine a directed state based on the direction of a signal received from the electronic apparatus 200.

For example, in the left three drawings of which the angle formed by a longitudinal direction of the remote controller 100 and a direction of received signal is equal to or greater than a predetermined angle, it may be determined that the processor 120 does not direct the electronic apparatus 200. On the contrary, in the right three drawings of which angle formed by a longitudinal direction of the remote controller 100 and a direction of received signal is smaller than the predetermined angle, it may be determined that the processor 120 directs the electronic apparatus 200. That is, in the case of three drawings at the right side, it may be said that the direction of the remote controller 100 directs the electronic apparatus 200.

Here, the longitudinal direction of the remote controller 100 may be a longitudinal direction of the antenna included in the remote controller 100.

However, it is merely an embodiment, and the angle of the direction of the remote controller 100 may be within a wider angle. For example, it may be determined that the processor 120 directs the electronic apparatus 200 in the right four drawings, and it may vary according to an initial predetermined value of the predetermined angle.

Meanwhile, the method for measuring the above mentioned angle will be described through FIG. 4B.

FIG. 4B illustrates two antennas of which distance is d, and a wave front of a received signal. Here, an incidence angle θ of the signal received from the first antenna may be shown as an equation as follows.

$$\theta = \arccos((\psi\lambda)/(2\pi d)) \qquad \text{[Equation]}$$

Here, ψ refers to a phase difference, and λ refers to a wavelength.

The phase difference and the wavelength may be obtained through two antennas.

As described above, the processor 120 may determine a directed state by measuring one angle. However, if a plurality of electronic apparatuses are concentrated, a problem may occur. For example, if there are two adjacent display apparatuses, and if the remote controller 100 directs between the two display apparatuses, the angles formed by the longitudinal direction of the remote controller 100 and each signal received by the two display apparatuses may be the same. In this case, the processor 120 may not determine the display apparatus to perform communication via an exclusive communication channel. In order to resolve this problem, two angles may be measured.

Figure 5A:
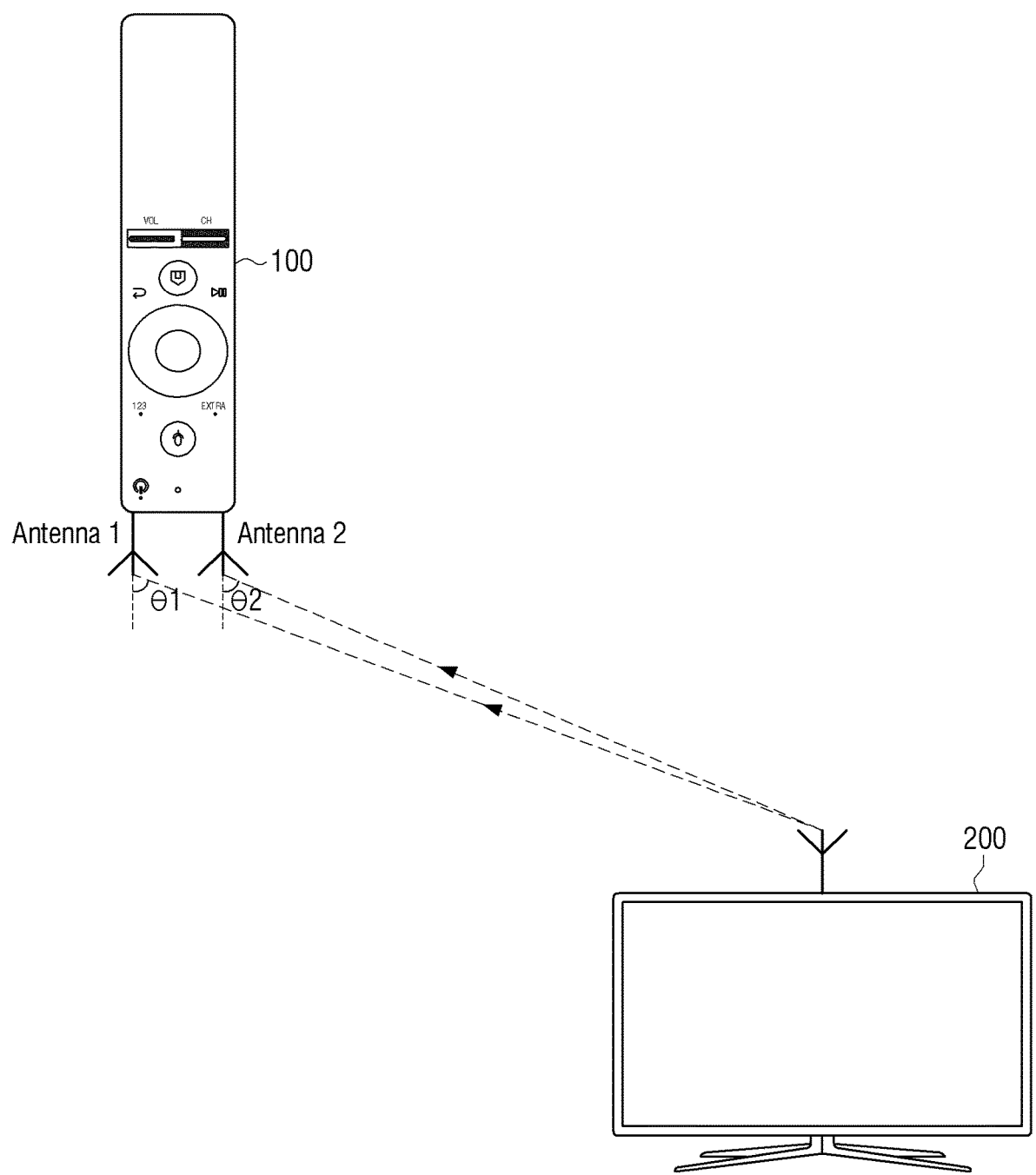
FIGS. 5A to 5C are views illustrating a method for determining a directional status according to another embodiment.
Figure 5B:
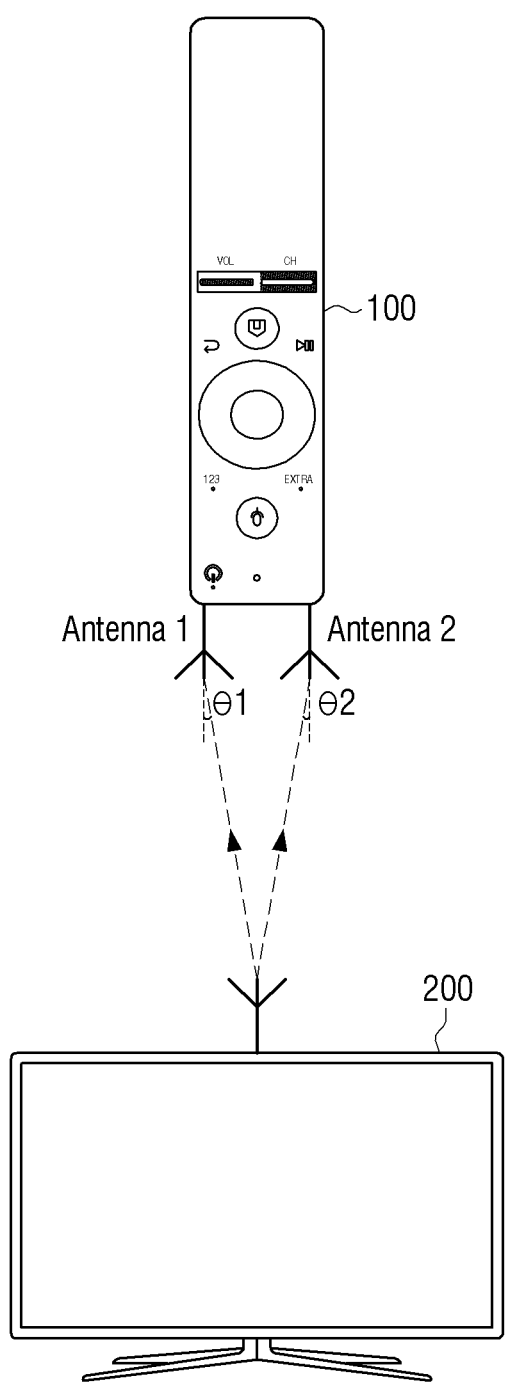
Figure 5C:
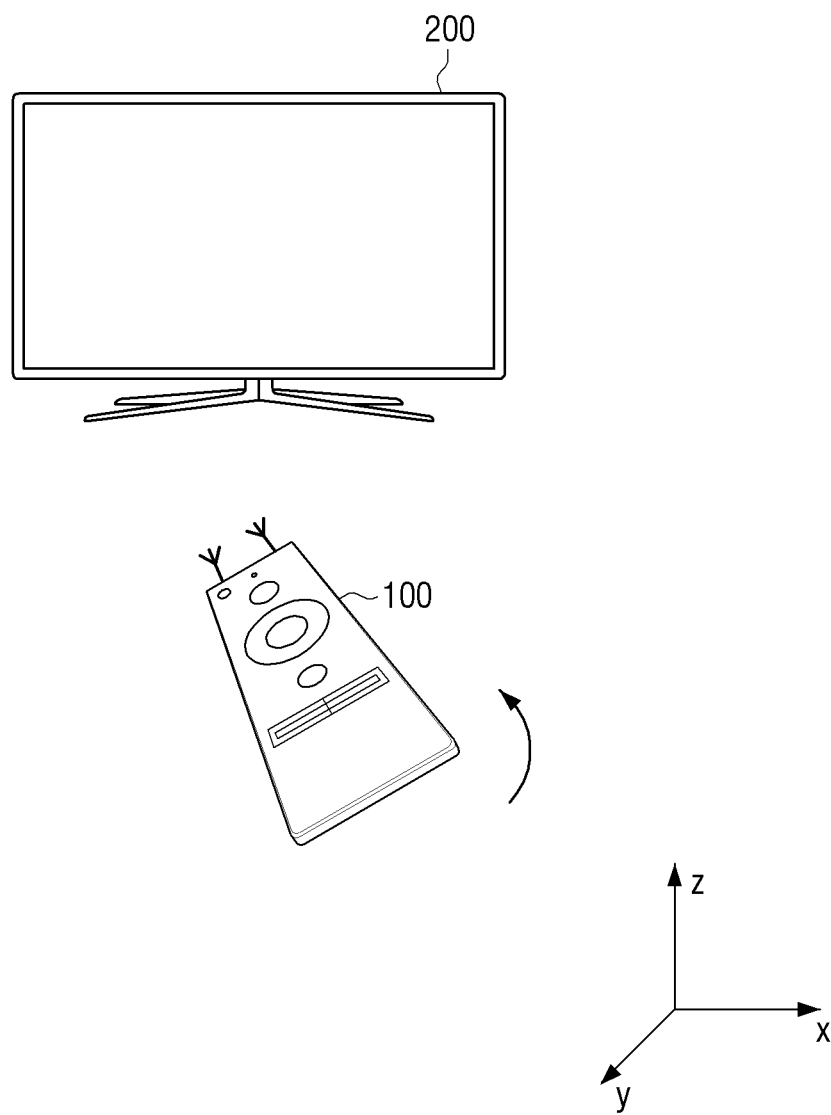

FIGS. 5A to 5C are views illustrating a method for determining a directed state according to another embodiment.

As illustrated in FIG. 5A, the processor 120 may measure two angles from each of two antennas and the received signal. In addition, as illustrated in FIG. 5B, if the phases of two angles are opposite and the difference between the absolute values of two angles is within a predetermined value, the processor 120 may determine that the electronic apparatus 200 that transmits the corresponding signal is directed.

Two antennas are illustrated in FIGS. 5A and 5B, but the remote controller 100 may include more antennas to improve an accuracy of the measurement of the angle.

Meanwhile, as illustrated in FIG. 5C, if the remote controller 100 is tilted, a correction thereof is required. For example, if the remote controller 100 is tilted from axis x toward axis z, the processor 120 may sense the slope of the remote controller 100 through an acceleration sensor included in the remote controller 100 and correct two measured angles. Here, the angle may be corrected by a simple trigonometrical function, and thus a detailed description thereof will be omitted.

FIG. 6 is a sequence diagram illustrating a method for sharing a content between electronic apparatuses according to an embodiment.

First, if there are a change of an orientation state of a remote controller of a user in S611 and a Play/Pause button manipulation in S612, the remote controller 100 transmits an identification information request signal to the electronic apparatus 200 in S621. In addition, the electronic apparatus 200 transmits the identification information signal to the remote controller 100 in S631. The remote controller 100 receives the identification information signal and determines whether the electronic apparatus 200 is directed in S622.

The above process is the same as FIG. 3A, and thus a detailed description will be omitted. However, in FIG. 6, it has been described that the remote controller 100 transmits an identification information request signal only to the electronic apparatus 200, but it is for convenience for explanation. If it is determined that the remote controller 100 does not direct the electronic apparatus 200, an identification information request signal may be transmitted to another electronic apparatus 200 to determine whether the other electronic apparatus 200 is directed.

If it is determined that the remote controller 100 directs the electronic apparatus 200, communication with the electronic apparatus 200 may be performed through an exclusive communication channel in S650. In this case, the remote controller 100 and the electronic apparatus 200 may transmit and receive a signal in a predetermined time interval, and the remote controller 100 may not communicate with another electronic apparatus 300.

Meanwhile, the remote controller 100 may transmit a content information request signal which is being executed through an exclusive communication channel and a PAUSE command of the content being executed to the electronic apparatus 200. The electronic apparatus 200 may transmit content information being executed via the exclusive communication channel to the remote controller 100 and pause the content being executed in S632. The remote controller 100 may store the received content information in S623.

Here, the content information may include meta data information of the content, real time streaming information of the content, content URL information, playback information and the like.

Thereafter, there may be a change of an orientation state of a remote controller of a user in S613 and a Play/Pause button manipulation in S614. Here, a user may change the orientation state of the remote controller 100 to direct another electronic apparatus 300. In addition, the remote controller 100 may lift an exclusive communication channel with the electronic apparatus 200 according to a button manipulation.

Thereafter, the determination of reception and transmission of a signal and a directed state before the remote controller 100 performs communication via an exclusive communication channel with another electronic apparatus 300 is the same as described above, and thus will be omitted.

If it is determined that the remote controller 100 directs the other electronic apparatus 300, the communication with the other electronic apparatus 300 may be performed in S660. In this case, the remote controller 100 and the other electronic apparatus 300 may transmit and receive a signal at an interval of a predetermined time, and the remote controller 100 may not communicate with the electronic apparatus 200.

Meanwhile, the remote controller 100 may transmit the stored content information and a content execution command to another electronic apparatus 300 via an exclusive communication channel in S626. The other electronic apparatus 300 may play a content using the received content information in S642.

Via the above methods, a user may control only one electronic apparatus by using the remote controller 100, and may share a content between a plurality of electronic apparatuses. For example, a user may watch the content that the user has been watched via a TV at a living room sequentially with a TV in a room through the method explained in FIG. 6.

Meanwhile, it is possible that only some contents, not an entire content is shared. For example, in FIG. 6, the electronic apparatus 200 may be a TV in a living room, and the other electronic apparatus 300 may be a speaker in the living room. Here, a sound button not the Play/Pause button included in the remote controller is manipulated as in FIG. 6, an image is played via the TV and the sound may be played via a speaker.

Alternatively, the content being executed in the electronic apparatus 200 may be executed in the other electronic apparatus 300, and the execution in the electronic apparatus 200 may be maintained at the same time.

FIG. 7 is a flowchart for illustrating a method for controlling a remote controller according to an embodiment.

First, an identification information request signal is transmitted to a plurality of electronic apparatuses paired with the remote controller in S710. In addition, a signal including identification information is received from each of the plurality of electronic apparatuses in response to the identification information request signal in S720. In addition, a direction of a remote controller is identified based on the direction from which each of the signal is received in S740. In addition, communication with one of the plurality of electronic apparatuses is performed via an exclusive communication channel based on the identified direction in S740.

Here, the remote controller may include the first antenna and the second antenna formed parallel to each other, and performing the communication, S740, may include identifying an electronic apparatus to perform communication via the exclusive communication channel between a first electronic apparatus among the plurality of electronic apparatuses and a second electronic apparatus among the plurality of electronic apparatuses, based on a direction in which a first signal transmitted from the first electronic apparatus and a second signal transmitted from the second electronic apparatus are respectively received via the first antenna and a direction in which the first signal and the second signal are respectively received via the second antenna.

In addition, the performing communication, S740, may include calculating a first angle formed by the first antenna and a direction in which each of the first signal and the second signal is received via the first antenna, calculating a second angle formed by the second antenna and a direction in which each of the first signal and the second signal is received via the second antenna, and identifying an electronic apparatus of which a phase of the first angle and a phase of the second angle are opposite and a difference between an absolute value of the first angle and an absolute value of the second angle is within a predetermined angle, from between the first electronic apparatus and the second electronic apparatus, as an electronic apparatus to perform communication via the exclusive communication channel.

Here, sensing a slope of a remote controller and correcting the first angle and the second angle based on the slope of the sensed remote controller may be further included, and the identifying may include identifying an electronic apparatus to perform communication via an exclusive communication channel based on the corrected first angle and the corrected second angle.

Meanwhile, in the performing the communication, S740, if communication is performed via an exclusive communication channel, it may be impossible to perform a communication with the remaining electronic apparatus among the electronic apparatuses.

In addition, the transmitting, S710, may include transmitting an identification information request signal to a plurality of electronic apparatuses when a predetermined control command is input.

Here, the performing communication, S740, may further include receiving content information being executed in the electronic apparatus via the exclusive communication channel, and based on a predetermined control command being re-received, lifting an exclusive communication channel with the electronic apparatus and re-transmitting an identification information request signal to the plurality of electronic apparatuses, re-receiving a signal including identification information from each of the plurality of electronic apparatuses in response to the identification information request signal, re-identifying a direction of the remote controller based on a direction from which each of the signal is re-received, performing communication with another electronic apparatus among the plurality of electronic apparatuses via a new exclusive communication channel based on the re-identified direction, and transmitting the received content information to the other electronic apparatus via the new exclusive communication channel.

The re-transmitting may include, based on the predetermined control command being input again, transmitting a command for stopping an execution of a content being executed in the electronic apparatus to the electronic apparatus, lifting the exclusive communication channel with the electronic apparatus, and the transmitting the content information may include transmitting the received content information and the execution command of the received content to the other electronic apparatus via the new exclusive communication channel.

The sensing an orientation state of the remote controller and the transmitting, S710, may include, based on a detection that an orientation state of the remote controller is changed as or for more than a predetermined angle, lifting the exclusive communication channel with the electronic apparatus and transmitting the identification information request signal to the plurality of electronic apparatuses.

According to various embodiments, the remote controller may control a plurality of electronic apparatuses by performing communication with a directed electronic apparatus among the plurality of electronic apparatuses via an exclusive communication channel.

In addition, if the orientation state of the remote controller is changed and thus the electronic apparatus directed by the remote controller is changed, the remote controller may communicate a communication via an exclusive communication channel with a new electronic apparatus, and thus a user may control various apparatuses without performing an additional connection operation.

Meanwhile, the above described method according to various embodiments may be implemented in a form of an application that could be installed in at least one of an existing electronic apparatus and a display apparatus.

Further, the methods according to the above-described embodiments may be realized by upgrading the software or hardware of at least one of the existing electronic apparatus and display apparatus.

The above-described embodiments may be executed through an embedded server in at least one of the electronic apparatus and display apparatus, or through at least one external server from between the electronic apparatus and display apparatus.

According to an embodiment, the above-described embodiments may be realized as a software including an instruction stored in a machine-readable storage media which may be read by a machine (e.g., a computer). The machine is an apparatus that may call the instruction stored by the storage, and operate according to the called instruction, which may include an electronic apparatus (e.g. an electronic apparatus (A)) according to an embodiment. If the instruction is executed by a processor, the processor may perform the function corresponding to the instruction directly or by using other elements under the control of the processor. The instruction may include a code which is generated or executed by a compiler or an interpreter. A storing medium readable by an apparatus may be provided in a form of a non-transitory storing medium. Here, the 'non-transitory' merely means that a storing medium does not include a signal and tangible, and does not divide that data is stored in the storing medium semi-permanently or temporary.

In addition, according to an embodiment, the method according to the above described various embodiments may be provided by being included in a computer program product. The computer program product is a product which may be purchased between a seller and a buyer. The computer program product may be distributed in a form of storing medium that may be read by an apparatus (e.g., compact disc read only memory (CD-ROM)), or distributed online through an application store (e.g., Play Store™). In the case of the online distribution, at least some of the computer program product may be stored in a medium such as a server of a manufacturer, a server of an application store, or a memory of an intermediate server transitorily or temporarily.

In addition, according to an embodiment, various exemplary embodiments described above may be implemented in a recording medium that may be read by a computer or a similar apparatus to the computer by using software, hardware, or a combination thereof. In some cases, embodiments that are described in the present disclosure may be embodied as the processor itself. In a software embodiment, various embodiments described in the present disclosure such as a procedure and a function may be implemented as separate software modules. The software modules may respectively perform one or more functions and operations described in the embodiments.

According to an embodiment, the above-described computer instructions for performing a processing operation of an apparatus may be stored in a non-transitory computer-readable medium. The computer instructions stored in the non-transitory computer-readable medium lets a specific apparatus to perform a processing operation in an apparatus according to the various embodiments when being executed by a processor of a specific apparatus. The non-transitory computer-readable medium is not a medium that stores data for a short moment such as a register, a cash and a memory and the like, but a medium that stores data semi-permanently and which is readable by an apparatus. For example, the non-transitory computer-readable medium may be CD, DVD, a hard disc, Blu-ray disc, USB, a memory card, ROM, or the like.

Elements according to the above-described embodiments (e.g., module or program) may be composed of a single or a plurality of elements respectively, and some of the constituent elements may be omitted or other additional constituent element may be added. Additionally or alternatively, some elements (e.g., module or program) may be integrated in one entity and perform the function performed by the corresponding element before the integration in the same or similar way. Operations performed by a module, a program module, or other component, according to various exemplary embodiments, may be sequential, parallel, or both, executed iteratively or heuristically, or at least some operations may be performed in a different order, omitted, or other operations may be added.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A remote controller comprising:
   a communicator; and
   a processor configured to:
   control the communicator to transmit an identification information request signal to a plurality of electronic apparatuses paired with the remote controller,
   receive from two or more of the plurality of electronic apparatuses a signal that includes identification information in response to the identification information request signal,
   identify an orientation state of the remote controller based on a direction from which each of the signals from the two or more of the plurality of electronic apparatuses, is received,
   perform communication via an exclusive communication channel between the remote controller and one of the plurality of electronic apparatuses based on the identified orientation state, and
   prevent communication with others of the plurality of electronic apparatuses while the one of the plurality of electronic apparatuses is communicating via the exclusive communication channel.

2. The remote controller as claimed in claim 1, further comprising a first antenna and a second antenna which are parallel to each other,
   wherein the plurality of electronic apparatuses includes a first electronic apparatus and a second electronic apparatus;
   wherein the processor is further configured to identify the first electronic apparatus as the one of the plurality of communication apparatuses to perform communication via the exclusive communication channel, based on a direction in which a first signal transmitted from the first electronic apparatus and a second signal transmitted from the second electronic apparatus are respectively received via the first antenna, and a direction in which the first signal and the second signal are respectively received via the second antenna.

3. The remote controller as claimed in claim 2, wherein the processor is further configured to calculate a first angle formed by the first antenna and a direction at which each of the first signal and the second signal is received by the first antenna, and a second angle formed by the second antenna and a direction at which each of the first signal and the second signal is received by the second antenna, and
   identify one of the first and second electronic apparatuses for which a phase of the first angle and a phase of the second angle are opposite and a difference between an absolute value of the first angle and an absolute value of the second angle is within a predetermined value,
   wherein the identified one of the first and second electronic apparatuses is to perform communication via the exclusive communication channel.

4. The remote controller as claimed in claim 3, further comprising an acceleration sensor,
   wherein the processor is further configured to correct the first angle and the second angle based on a slope of the remote controller sensed by the acceleration sensor, and to identify the one of the plurality of electronic apparatuses to perform communication via the exclusive communication channel based on the corrected first angle and the corrected second angle.

5. The remote controller as claimed in claim 1, wherein the processor is further configured to transmit the identification information request signal to the plurality of electronic apparatuses based on a first predetermined control command being input.

6. The remote controller as claimed in claim 5, wherein the processor is further configured to
   receive content information being executed in the one of the plurality of electronic apparatuses via the exclusive communication channel, and
   based on a second predetermined control command being input, terminate the communication via the exclusive communication channel and retransmit the identification information request signal to the plurality of electronic apparatuses, and
   based on a signal that includes identification information being re-received from each of the plurality of electronic apparatuses in response to the identification information request signal, re-identify a direction of the remote controller based on a direction from which each of the signals is re-received, and perform communication with another electronic apparatus among the plurality of electronic apparatuses via a new exclusive communication channel based on the re-identified direction, and transmit the received content information to the another electronic apparatus via the new exclusive communication channel.

7. The remote controller as claimed in claim 6, wherein the processor is further configured to, based on the second predetermined control command being input again, transmits to the another electronic apparatus, a command for stopping an execution of a content by the another electronic apparatus, and terminate the communication via the exclusive communication channel by the another electronic apparatus, and
transmit the received content information and an execution command of the received content to an additional electronic apparatus via the new exclusive communication channel.

8. The remote controller as claimed in claim 1, further comprising a sensor,
wherein the processor is further configured to terminate the communication via the exclusive communication channel based on a detection by the sensor that an orientation state of the remote controller has changed by more than a predetermined angle and to transmit the identification information request signal to the plurality of electronic apparatuses.

9. The remote controller as claimed in claim 8, wherein the processor is further configured to terminate the communication via the exclusive communication channel based on a detection by the sensor that a grip by a user of the remote controller and the orientation state are changed by more than the predetermined angle and to transmit the identification information request signal to the plurality of electronic apparatuses.

10. A controlling method of a remote controller, comprising:
transmitting an identification information request signal to a plurality of electronic apparatuses paired with the remote controller;
receiving a signal including identification information from two or more of the plurality of electronic apparatuses, in response to the identification information request signal;
identifying an orientation state of the remote controller based on a direction from which each of the signals from the two or more of the plurality of electronic apparatuses, is received; and
performing communication via an exclusive communication channel between the remote controller and one of the plurality of electronic apparatuses based on the identified orientation state,
the performing communication comprising preventing communication with others of the plurality of electronic apparatuses while communication is performed with the one of the plurality of electronic apparatuses via the exclusive communication channel.

11. The controlling method as claimed in claim 10, wherein the remote controller includes a first antenna and a second antenna which are parallel to each other,
wherein the plurality of electronic apparatuses includes a first electronic apparatus and a second electronic apparatus; and
wherein the performing communication comprises identifying the first electronic apparatus of the plurality of electronic apparatuses, to perform communication via the exclusive communication channel, based on a direction in which a first signal transmitted from the first electronic apparatus and a second signal transmitted from the second electronic apparatus are respectively received via the first antenna and a direction in which the first signal and the second signal are respectively received via the second antenna.

12. The controlling method as claimed in claim 11, wherein the performing communication comprises:
calculating a first angle formed by the first antenna and a direction in which each of the first signal and the second signal is received via the first antenna, and a second angle formed by the second antenna and a direction in which each of the first signal and the second signal is received via the second antenna and
identifying one of the first and second electronic apparatuses for which a phase of the first angle and a phase of the second angle are opposite and a difference between an absolute value of the first angle and an absolute value of the second angle is within a predetermined value, wherein the identified one of the first and second electronic apparatuses is to perform communication via the exclusive communication channel.

13. The controlling method as claimed in claim 12, further comprising:
sensing a slope of the remote controller; and
correcting the first angle and the second angle based on the sensed slope of the remote controller,
wherein the identifying comprises identifying the first electronic apparatus to perform communication via the exclusive communication channel based on the corrected first angle and the corrected second angle.

14. The controlling method as claimed in claim 10, wherein the transmitting comprises transmitting the identification information request signal to the plurality of electronic apparatuses based on a first predetermined control command being input.

15. The controlling method as claimed in claim 14, wherein the performing communication comprises receiving content information being executed in the one of the plurality of electronic apparatuses via the exclusive communication channel, and further comprising:
based on a second predetermined control command being input, terminating the communication via the exclusive communication channel and re-transmitting the identification information request signal to the plurality of electronic apparatuses;
re-receiving a signal including identification information from one or more of the plurality of electronic apparatuses in response to the identification information request signal;
re-identifying a direction of the remote controller based on a direction from which each of the signals is re-received;
performing communication with another electronic apparatus among the plurality of electronic apparatuses via a new exclusive communication channel based on the re-identified direction; and
transmitting the received content information to the another electronic apparatus via the new exclusive communication channel.

16. The controlling method as claimed in claim 15, wherein the re-transmitting comprises, based on the predetermined control command being input again, transmitting a command for stopping an execution of a content being executed in the electronic apparatus, to the electronic apparatus, and terminating the communication via the exclusive communication channel, and wherein the transmitting the content information comprises transmitting the received content information and the execution command of the received content to the other electronic apparatus via the new exclusive communication channel.

17. The controlling method as claimed in claim 10, further comprising sensing an orientation state of the remote controller, and wherein the transmitting comprises, based on a detection that an orientation state of the remote controller has changed by more than a predetermined angle, terminating the communication via the exclusive communication channel and transmitting the identification information request signal to the plurality of electronic apparatuses.

18. A non-transitory computer readable medium having stored therein a program that causes a computer to execute a process, the process comprising:

transmitting an identification information request signal to a plurality of electronic apparatuses paired with a remote controller;

receiving a signal including identification information from two or more of the plurality of electronic apparatuses, in response to the identification information request signal;

identifying an orientation state of the remote controller based on a direction from which each of the signals from the two or more of the plurality of electronic apparatuses is received; and performing communication via an exclusive communication channel between the remote controller and one of the plurality of electronic apparatuses based on the identified orientation state, the performing communication comprising preventing communication with others of the plurality of electronic apparatuses while communication is performed with the one of the plurality of electronic apparatuses via the exclusive communication channel.

* * * * *